(12) United States Patent
Tisserand et al.

(10) Patent No.: US 10,065,508 B2
(45) Date of Patent: Sep. 4, 2018

(54) SYSTEM FOR CONTROLLING SUPPLY VOLTAGE OF ON-BOARD ELECTRICAL NETWORK OF MOTOR VEHICLE

(71) Applicant: VALEO EQUIPEMENTS ELECTRIQUES MOTEUR, Creteil (FR)

(72) Inventors: Pierre Tisserand, Limeil Brevannes (FR); Pierre Chassard, Creteil (FR); Laurent De Lamarre, Paris (FR); Thibault Arrou, Creteil (FR)

(73) Assignee: Valeo Equipements Electriques Moteur, Creteil (FR)

( * ) Notice: Subject to any disclaimer, the term of this patent is extended or adjusted under 35 U.S.C. 154(b) by 197 days.

(21) Appl. No.: 14/909,527

(22) PCT Filed: Jul. 29, 2014

(86) PCT No.: PCT/FR2014/051965
§ 371 (c)(1),
(2) Date: Feb. 2, 2016

(87) PCT Pub. No.: WO2015/015115
PCT Pub. Date: Feb. 5, 2015

(65) Prior Publication Data
US 2016/0185231 A1     Jun. 30, 2016

(30) Foreign Application Priority Data
Aug. 2, 2013   (FR) ...................................... 13 57725

(51) Int. Cl.
*B60L 1/00*      (2006.01)
*B60L 3/00*      (2006.01)
(Continued)

(52) U.S. Cl.
CPC ............... *B60L 11/02* (2013.01); *B60L 11/18* (2013.01); *H02H 3/05* (2013.01); *H02H 7/065* (2013.01); *H02P 27/10* (2013.01); *H02H 3/202* (2013.01)

(58) Field of Classification Search
CPC .......... H02H 3/05; H02H 3/202; H02H 7/065; H02P 27/10
See application file for complete search history.

(56) References Cited

U.S. PATENT DOCUMENTS

| 5,285,344 | A |   | 2/1994  | Heitzmann |           |
|-----------|---|---|---------|-----------|-----------|
| 5,982,155 | A | * | 11/1999 | Rechdan   | H02J 7/245 |
|           |   |   |         |           | 318/400.31 |

(Continued)

FOREIGN PATENT DOCUMENTS

| CN | 1185678 | 6/1998 |
|----|---------|--------|
| EP | 2482445 | 8/2012 |

(Continued)

OTHER PUBLICATIONS

First Office Action of corresponding US application dated Jun. 2, 2017.

(Continued)

*Primary Examiner* — Jared Fureman
*Assistant Examiner* — Esayas Yeshaw
(74) *Attorney, Agent, or Firm* — Berenato & White, LLC

(57) ABSTRACT

System (17) for managing a supply voltage (B+A) of an onboard electrical network of a motor vehicle comprises a device (2, 4, 9, 16) for regulating the supply voltage and a device (10, 11) for protecting the onboard electrical network against overvoltages, the two devices together controlling an excitation of an alternator supplying the onboard electrical network. According to the invention, the protection device is separate from the regulating device. An overvoltage signal (Continued)

(OVD) generated by the protection device (11) and controlling the excitation has priority over an excitation signal (EXC) generated by the regulating device. The regulating device and the protection device can be in the form of two separate electronic blocks on separate substrates.

18 Claims, 6 Drawing Sheets

(51) Int. Cl.
    *H02G 3/00*     (2006.01)
    *B60L 11/02*     (2006.01)
    *H02H 3/05*     (2006.01)
    *H02H 7/06*     (2006.01)
    *H02P 27/10*     (2006.01)
    *B60L 11/18*     (2006.01)
    *H02H 3/20*     (2006.01)

(56) References Cited

U.S. PATENT DOCUMENTS

| | | | |
|---|---|---|---|
| 6,294,899 B1 | 9/2001 | Tokugawa et al. | |
| 6,400,125 B1 | 6/2002 | Pierret | |
| 6,608,470 B1* | 8/2003 | Oglesbee | H01M 2/348 |
| | | | 320/135 |
| 2007/0126505 A1* | 6/2007 | Bockelman | H01L 23/645 |
| | | | 330/252 |
| 2008/0036431 A1* | 2/2008 | Wolf | H02H 7/067 |
| | | | 323/234 |
| 2010/0225284 A1 | 9/2010 | Aoyama | |
| 2013/0229146 A1* | 9/2013 | Demilato | H02J 7/0029 |
| | | | 320/107 |
| 2014/0375238 A1* | 12/2014 | Kurfiss | H02J 7/14 |
| | | | 318/400.22 |
| 2015/0098160 A1* | 4/2015 | Gao | H03K 17/0822 |
| | | | 361/86 |

FOREIGN PATENT DOCUMENTS

| | | |
|---|---|---|
| GB | 2246254 | 1/1992 |
| JP | H0652400 U | 7/1994 |
| JP | H07236234 A | 9/1995 |
| JP | 2010206959 A | 9/2010 |
| WO | WO2013110482 | 8/2013 |

OTHER PUBLICATIONS

English Language Translation of Japanese Office Action dated Apr. 3, 2018 in corresponding Japanese Patent Application No. 2016-530587.

* cited by examiner

SYSTEM FOR CONTROLLING SUPPLY VOLTAGE OF ON-BOARD ELECTRICAL NETWORK OF MOTOR VEHICLE

CROSS-REFERENCE TO RELATED APPLICATIONS AND CLAIM TO PRIORITY

This application is a national stage application of International Application No. PCT/FR2014/051965 filed Jul. 29, 2014, which claims priority to French Patent Application No. 1357725 filed Aug. 2, 2013, the disclosures of which are incorporated herein by reference and to which priority is claimed.

FIELD OF THE INVENTION

The present invention relates to a system for controlling a supply voltage of an on-board electrical network of a motor vehicle.

The invention also relates to an alternator of a motor vehicle comprising a system of this type.

BACKGROUND OF THE INVENTION

The alternators which are present in all cars have a regulation loop which makes it possible to maintain the voltage of the on-board electrical network at approximately 14 V.

However, the regulators of alternators sometimes include so-called protection functions, such as the detection of excess voltages of the on-board network (>18 V).

Certain regulators cut the generation of current of the alternator, whereas others alert the driver by lighting a red warning light on the dashboard so that the vehicle and the engine can be stopped as quickly as possible.

When an excess voltage is detected by the regulator of the alternator, the excitation must be cut in order to protect the equipment against the excess voltage which could damage both the battery and the connected components.

In most of the present regulators, this function is carried out by processing the signal emitted from the analogue digital converter (CAN). In the oldest regulators, which are known as "analogue", this function is carried out on the small signals of the regulation loop, which is virtually the equivalent of the aforementioned digital solutions.

However the entire acquisition chain and the digital processing means are on the path of this detection: reference is then made to a common mode for these functions.

In the event of a problem or defect in this common mode, the regulator might not detect this excess voltage, and could contribute to an excess load of the battery, which could damage it, as well as the equipment connected to its terminals.

FIG. 1 shows a general diagram of these known regulators of the prior art.

For example, if resistors R1, R2 or R3 of the detector are shunted and their value is increased to the extent of generating excess voltages, if a capacitor C1 of the filter is short-circuited, the analogue-digital converter CAN supplies erroneous data lower than the expected value, and even if the clock H is blocked with an "ON" command, the architecture can not detect its own faults, since they are in the so-called common mode. All the functions of the regulator, including the power MOSFET which switches the excitation current of the alternator, are potentially affected by this problem associated with the common mode.

To conclude, in the prior art, detection of excess voltage is designed on the principle that the regulator is not defective.

However, the voltage of the on-board network also depends on the elements of the regulator which can have defects.

SUMMARY OF THE INVENTION

The objective of the present invention is thus to eliminate these disadvantages.

Specifically, its subject is a system for controlling a supply voltage of an on-board electrical network of a motor vehicle.

This system is of the type of those which in themselves are known, comprising a device of a digital type for regulation of the supply voltage and a device for protection against excess voltages of the on-board electrical network.

In this type of system, the regulation device and the protection device control jointly excitation of an alternator which supplies the on-board electrical network.

According to the invention, the protection device is distinct from the regulation device.

In this system, an excess voltage signal which is generated by the protection device and controls the excitation takes priority over an excitation signal which is generated by the regulation device.

According to a particular embodiment, the protection device comprises:

first means for acquisition of the supply voltage and/or a battery voltage at the terminals of the battery which is connected to the on-board electrical network;

means for comparison of the supply voltage and/or of the battery voltage, respectively with a first reference voltage and/or a second reference voltage;

means for integration of an output signal of the means for comparison;

interface means which generate the excess voltage signal from the integrated output signal.

According to a particular characteristic, the means for comparison have a hysteresis.

According to another particular characteristic, the first means for acquisition comprise first means for capturing the supply voltage and/or the battery voltage, and first filtering means.

The means for integration preferably comprise an offset register which is controlled by a first clock.

According to another particular characteristic, the protection device comprises a semiconductor protection switch which can open the excitation circuit of the alternator at the command of the excess voltage signal, and additionally comprises a dedicated electrical supply.

According to a particular embodiment, the system for controlling a supply voltage of an on-board electrical network of a motor vehicle according to the invention additionally comprises a power circuit comprising a semiconductor excitation switch which can switch an excitation circuit of the alternator and is controlled by a control signal generated by means for validation of the excitation signal by the excess voltage signal.

According to a particular embodiment, the regulation device comprises:

second means for acquisition of the battery voltage;

a regulation loop, for example of the digital type, which generates the excitation signal according to the battery voltage.

According to a particular characteristic, these second means for acquisition comprise second means for capturing the battery voltage, comprising a bridge of resistors and second filtering means comprising a capacitor.

According to another particular characteristic, the digital regulation loop comprises, controlled by a second clock, an analogue-digital converter at the output of the second filtering means, and a microcontroller, a wired logic circuit or the like, at the output of the analogue-digital converter.

According to a particular embodiment of the control system according to the invention, the regulation device and the protection device are produced in the form of two distinct electronic blocks on separate substrates.

The invention also relates to an alternator of a motor vehicle, which is distinguished in that it comprises the system for controlling a supply voltage of an on-board electrical network of a motor vehicle previously described.

These few essential specifications will have made apparent to persons skilled in the art the advantages provided by the invention in comparison with the prior art.

The detailed specifications of the invention are given in the description which follows in association with the appended drawings. It should be noted that these drawings serve the purpose simply of illustrating the text of the description, and do not constitute in any way a limitation of the scope of the invention.

DETAILED DESCRIPTION OF THE PREFERRED EMBODIMENT(S)

Figure 1:
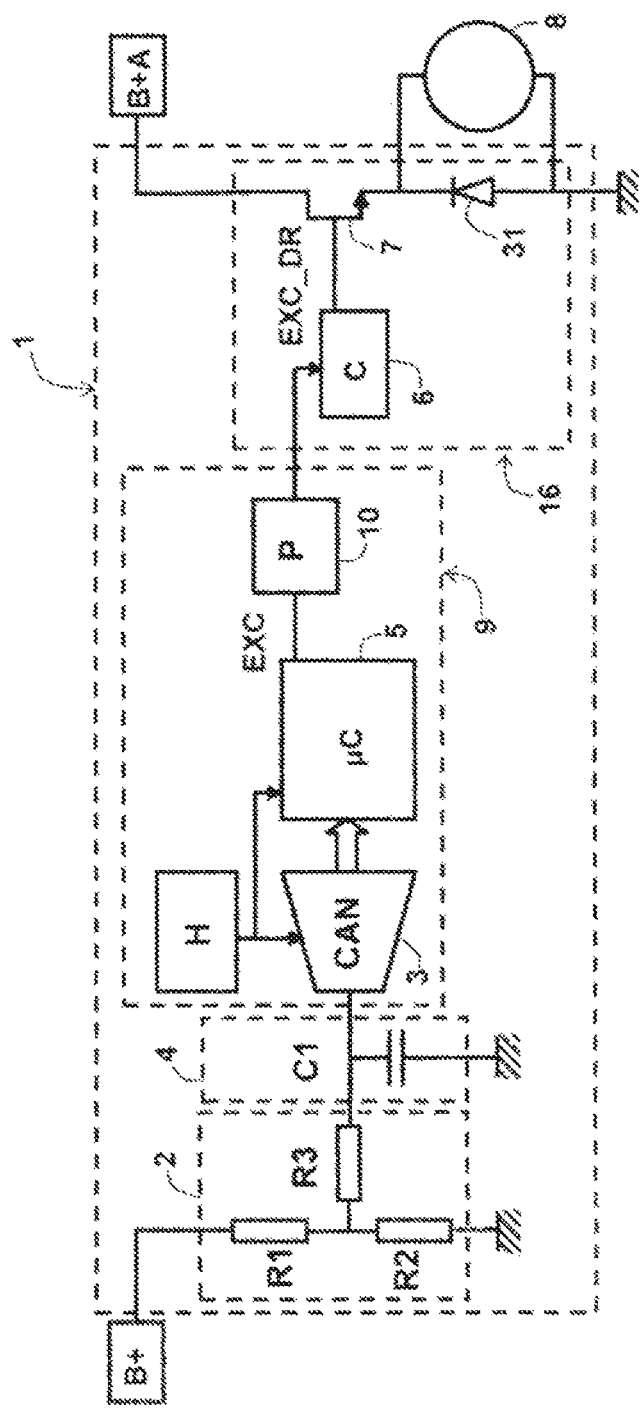
FIG. 1 is a schematic diagram of a system for controlling a supply voltage of an on-board network of a motor vehicle known in the prior art, comprising a device for protection against excess voltages incorporated in the regulation device.

As already indicated in the preamble, FIG. 1 shows a generic architecture of a system 1 for controlling a supply voltage B+A of an on-board electrical network of a motor vehicle.

An alternator supplies this network with the supply voltage B+A in order to charge a battery which is connected to the network.

After having been brought to a level 2 which is compatible with an analogue-digital converter 3, a battery voltage B+ is filtered 4 and sampled before being processed by a processing unit 5.

This processing unit 5, which is mostly constituted by a microcontroller or a microprocessor, or by a wired logic circuit, produces an excitation signal EXC, with modulated pulse width, which, after amplification 6, controls a semi-conductor excitation switch 7 in the form of a MOSFET transistor in series in an excitation circuit 8 of the alternator, i.e. habitually the rotor coil.

A duty cycle of the excitation signal EXC is determined by the processing unit 5, such as to control the supply voltage B+A of the network which is supplied by the alternator, in order to maintain the battery voltage B+ at a nominal voltage.

In the generic known control system 1 shown in FIG. 1, the digital regulation loop 9 comprises, between the processing unit 5 and the driver amplifier 6 which controls the excitation switch 7, an integrated device 10 for protection against excess voltages at the terminals of the battery, which device analyses the signals transmitted.

If the digital regulation loop 9 is defective, the integrated protection device 10 is no longer functional.

Figure 2:
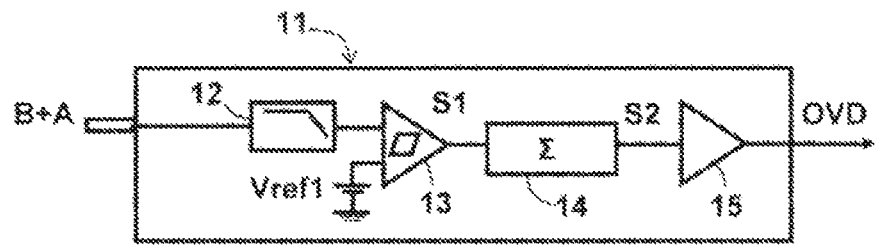
FIG. 2 is a synoptic diagram of a device for protection against excess voltages distinct from the regulation device according to the invention.

On the other hand, FIG. 2 shows a protection device 11 for protection against excess voltages which is distinct from a regulation device 2, 4, 9, 6, and in particular from the digital regulation loop 9.

In a first embodiment of the invention, this protection device 11 comprises:

a first acquisition system 12 which captures and filters the supply voltage B+A supplied by the alternator which supplies the on-board electrical network of the vehicle;

a comparison system 13 for comparison of this supply voltage B+A with a first reference voltage Vref1;

an integration system 14 for integration of the output signal S1 of the comparison system 13 for comparison;

an interface system 15, which, from the integrated output signal S2, generates an excess voltage signal OVD which indicates that the supply voltage B+A has exceeded the first reference voltage Vref1.

Figure 3:
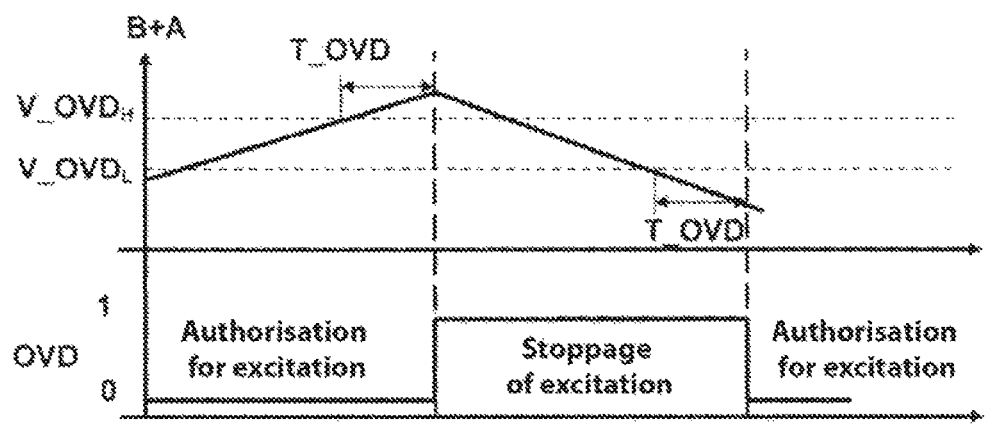
FIG. 3 is a timing diagram of the excess voltage signal generated by the protection device shown in FIG. 2.

The comparison system 13 for comparison have a hysteresis, i.e. as shown clearly in FIG. 3, the supply voltage B+A must exceed the first reference voltage Vref1 significantly until it reaches a high threshold $V\_OVD\_H$ in order for the excess voltage signal OVD to be active.

Conversely, the excess voltage signal OVD is deactivated only if the supply voltage B+A drops to significantly below the first reference voltage Vref1, to a low threshold $V\_OVD\_L$.

The integration system 14 for integration also requires the supply voltage B+A to remain above the high threshold $V\_OVD\_H$, or to remain below the low threshold $V\_OVD\_L$, for a duration which is longer than a predetermined period T_OVD, in order for the excess voltage signal OVD to flip from one state to the other.

Figure 4:
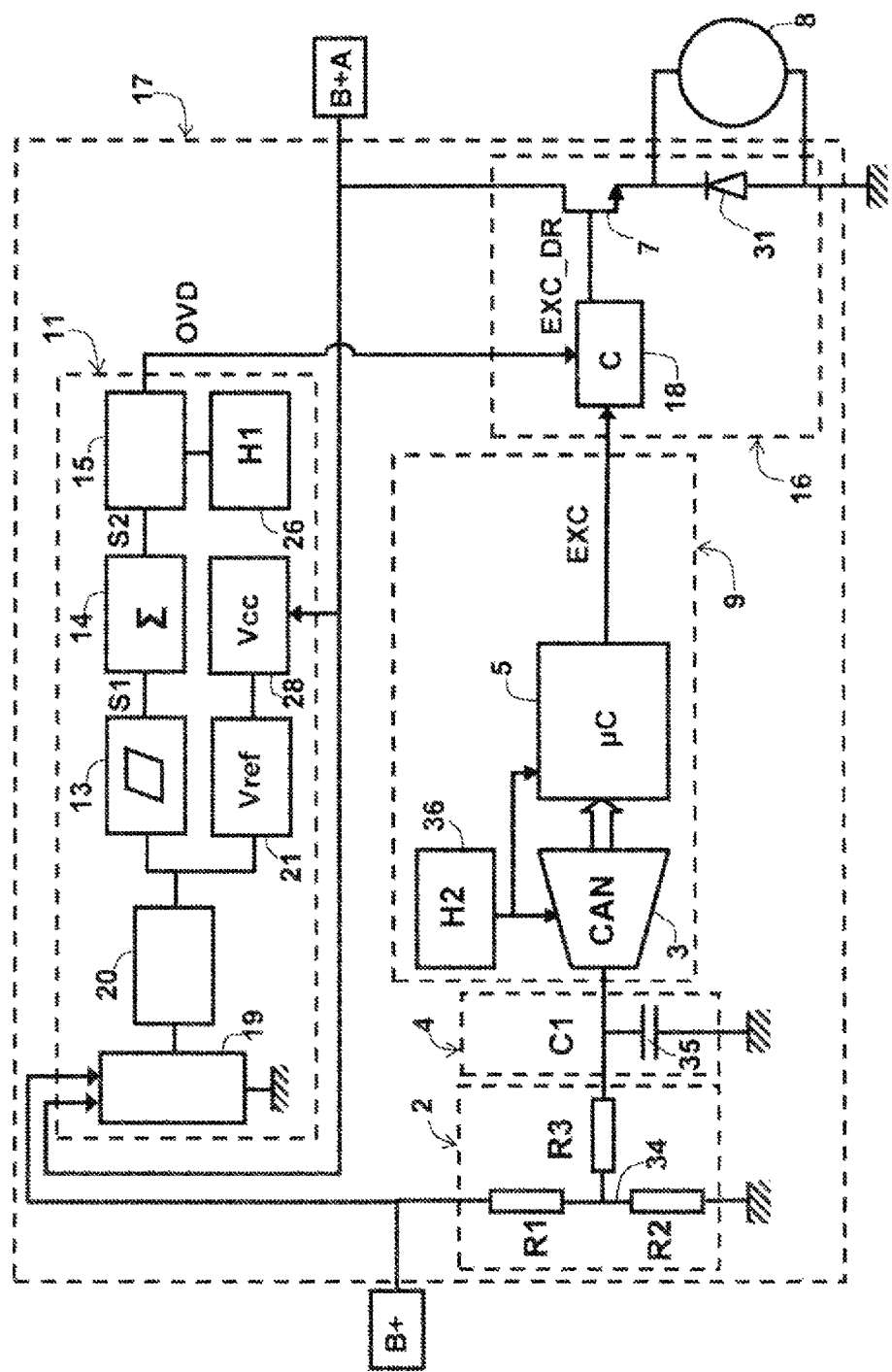
FIG. 4 is a schematic diagram of an embodiment of a system for controlling a supply voltage of an on-board electrical network of a motor vehicle according to the invention.

FIG. 4 shows clearly how the excess voltage signal OVD acts on the power circuit 16 which comprises the excitation switch 7 (power MOSFET) which switches the excitation of the alternator in the control system 17 according to the invention, according to a control signal EXC_DR.

The excess voltage signal OVD takes priority over the excitation signal EXC generated by the digital regulation loop 9 (which therefore does not comprise a device for protection against excess voltage), i.e. the excitation signal EXC is validated or is not validated by a validation system 18, according to the excess voltage signal OVD.

When the excess voltage signal OVD is not active (no excess voltage detected), the regulation loop 9 controls the excitation of the alternator normally, and the control signal EXC_DR is identical to the excitation signal EXC.

When the excess voltage signal OVD is active (excess voltage detected), the excitation signal EXC is replaced by this excess voltage signal OVD, i.e. the control signal EXC_DR becomes identical to the excess voltage signal OVD, such that the excitation of the alternator is stopped according to the timing diagram shown in FIG. 3.

The operation of the protection device 11 and of the power circuit 16 will be described in association with FIGS. 5 and 6, which show in detail a second particular embodiment of the control system 17 according to the invention, the schematic diagram of which is shown in FIG. 4.

In this second embodiment, the control system 17 for a supply voltage B+A of an on-board electrical network of a motor vehicle comprises a device 11 for protection against excess voltages, which generates the supply voltage B+A present at the terminals of the alternator, and also the battery voltage B+.

A first capturing system 19 makes it possible to return the supply voltage B+A and the battery voltage B+ to levels which are compatible with the electronic components, and in particular the digital components, of the protection device 11, before they are filtered by a first filter 20.

The comparison system 13 for comparison with the hysteresis make it possible to compare respectively the supply voltage B+A and the battery voltage B+, or more specifically proportional voltages, with the first reference voltage Vref1 and with a second reference voltage Vref2 which are supplied by a reference voltage generator 21, and to generate an output signal S1 which is representative of one or the other of these values Vref1, Vref2 being exceeded.

Figure 5:
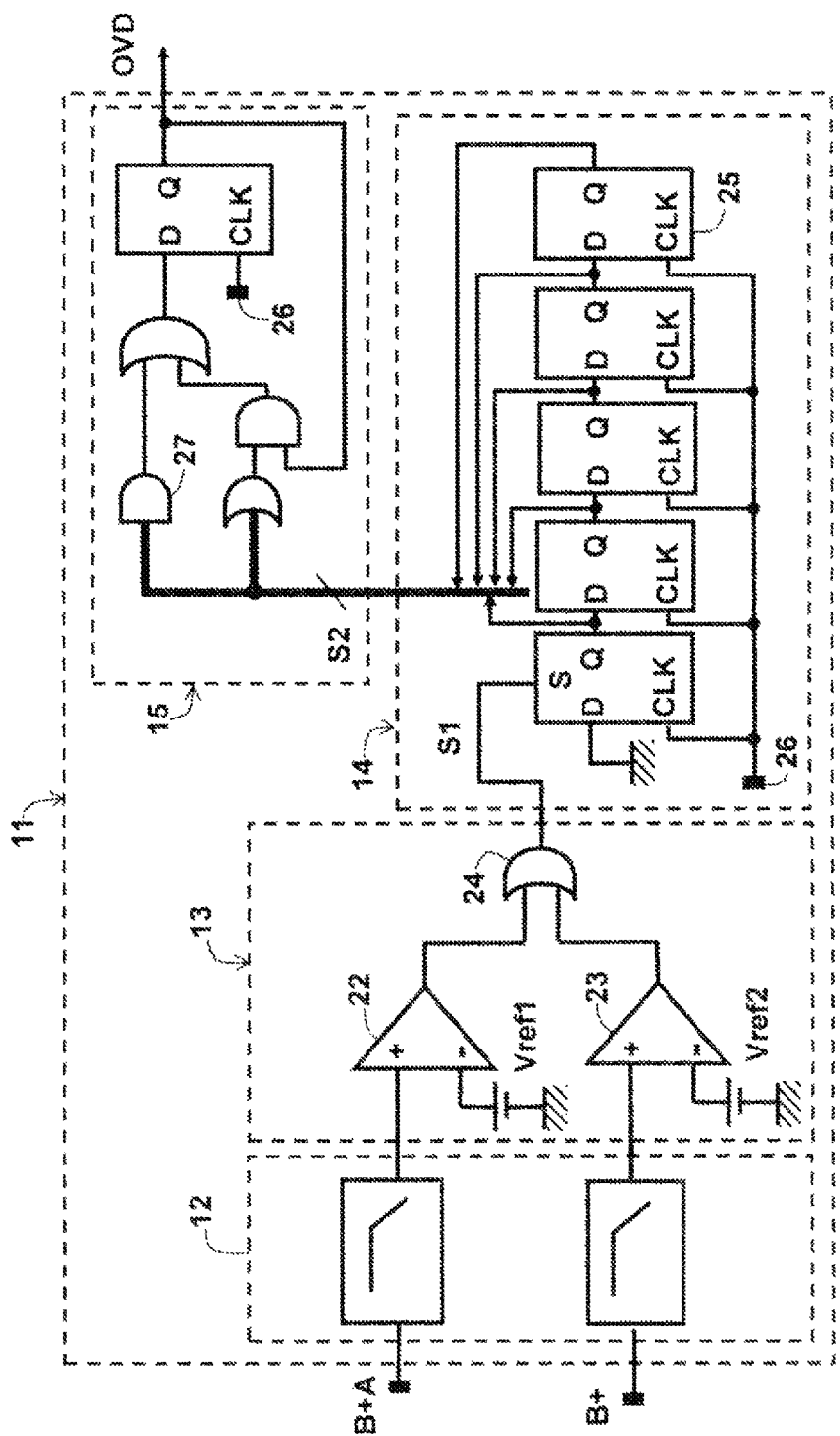
FIG. 5 is a detailed diagram of a particular embodiment of the protection device shown in FIG. 2.

The comparison system 13 for comparison in this second particular embodiment of the invention is shown clearly in FIG. 5.

They are constituted by two comparators 22, 23 which receive at their non-inverting inputs voltages which are proportional to the supply voltage B+A and to the battery voltage B+ supplied by the first acquisition system 12 including the first capturing system 19 and the first filter 20, and which receive on their inverting inputs the first and second reference voltages Vref1, Vref2.

The outputs of these comparators 22, 23 are combined by a logic OR 24 in order to supply the output signal S1 at the input of the integration system 14.

As shown clearly in FIG. 5, the integration system 14 includes an offset register formed by a plurality of toggles D25 which sample and store the output signal S1 at each period of a first clock 26.

Only an output signal S1 which is kept active for several consecutive periods generates an integrated output signal S2, in the form of a vector, all the components of which are active, and which can produce as output the interface system 15, comprising in particular a logic AND with a plurality of inputs 27, and an active excess voltage signal OVD.

The protection device 11 according to the invention comprises a dedicated electrical supply 28, in order not to depend on the regulation device 2, 4, 9, 16.

In particular, this electrical supply 28 supplies the reference voltage generator 21.

Figure 6:
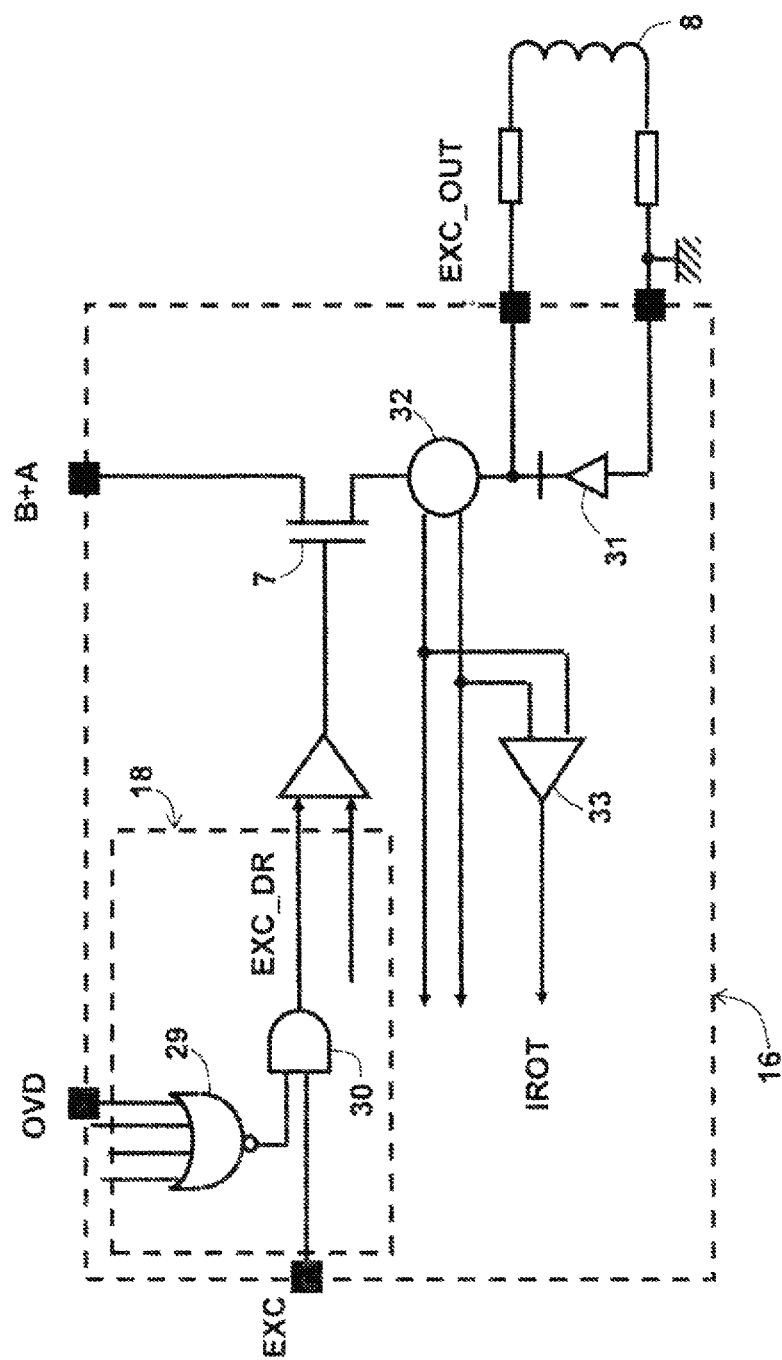
FIG. 6 is a detailed diagram of an embodiment of a power circuit of the system for controlling a supply voltage of an on-board electrical network of a motor vehicle shown in FIG. 4.

The power circuit 16 of this second embodiment of the system 17 for controlling a supply voltage B+A of an on-board electrical network of a motor vehicle, but also of the first embodiment, is shown in detail in FIG. 6.

The validation system 18 for validation comprise a logic NOR with a plurality of inputs 29, which is driven by the excess voltage signal OVD generated by the protection device 11 for protection and for other service signals.

The output of this gate 29 is combined with the excitation signal EXC in another gate 30 which provides an AND function in order to produce the control signal EXC_DR of the excitation switch 7

Thus, the output EXC_DR of this other gate 30 is identical to the excitation signal EXC when the excess voltage signal OVD is inactive, the other service signals also being inactive.

When the excess voltage signal OVD is active, irrespective of the state of the other service signals, the output of the gate 29 is inactive and the control signal EXC_DR at the output of the other gate 30 is inactive, irrespective of the excitation signal EXC supplied by the digital regulation loop 9, which interrupts the excitation EXC_OUT of the alternator.

It should be noted that the power circuit 16 of the control system 17 of a supply B+A of an on-board electrical network of a motor vehicle according to the invention differs from a power circuit 16 of a generic known control system 1, as shown in FIG. 1, only by two logic gates 29, 30.

The excitation current is switched by an excitation switch 7 of the MOSFET type, and the earth return comprises a free wheel diode 31.

The excitation current IROT is measured by means of a shunt 32, at the terminals of which a difference of potential is measured by an operational amplifier 33.

The device 2, 4, 9, 16 for regulation of the system 17 for control of a supply of an on-board electrical network of a motor vehicle according to the invention also includes the same elements as a device 2, 4, 9, 16 for regulation of a known generic system 1, as shown in FIG. 4:

a second acquisition system 2, 4 for acquisition of the battery voltage B+, comprising a second capturing system 2 by including at least one bridge of resistors 34, and a second filter including at least one capacitor 35;

a digital regulation loop 9 comprising a digital-analogue converter 3 and a processing unit 5 including a microcontroller or a microprocessor;

a second clock 36.

The essential difference is that the regulation loop 9 of the system 17 according to the invention does not comprise an integrated protection device 10, in order to avoid any common mode of functions.

For the same reason, the first clock 26 of the protection device 11 is distinct from the second clock 36 of the regulation loop 9.

The system 17 for control of a supply voltage B+A of an on-board electrical network of a motor vehicle according to the invention is produced in the form of an ASIC.

As a result of this modularity, and because the regulation device 2, 4, 9, 16 differs little from the prior regulation devices 2, 4, 9, 10, 16, and is even simplified, the development of the new ASIC requires only reduced investments.

Figure 7:
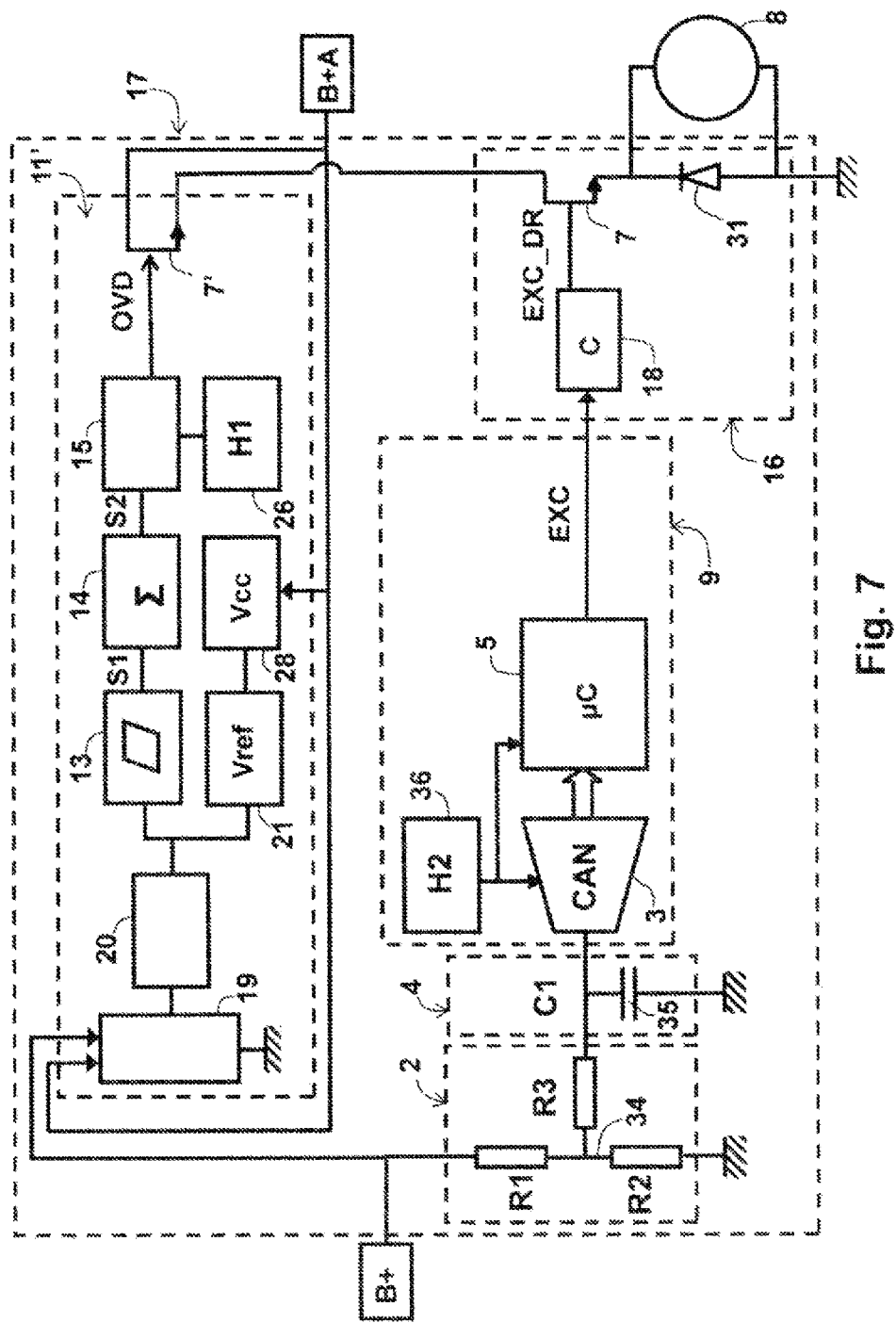
FIG. 7 is a schematic diagram of another embodiment of a system for controlling a supply voltage of an on-board electrical network of a motor vehicle according to the invention.

FIG. 7 shows another embodiment of the system for controlling a supply voltage of an on-board electrical network of a motor vehicle according to the invention. In this embodiment, the protection device, which in this case is designated as 11', comprises its own semiconductor power switch (MOSFET transistor) 7'. This switch 7' is a protection switch which can open the excitation circuit of the alternator at the command of the OVD signal, and is interposed in series between the supply voltage B+A and the excitation switch 7 of the circuit 16.

The embodiment according to FIG. 7 provides greater separation between the protection device 11' and the remainder of the regulator, and gives the protection device 11' the possibility of cutting the excitation current of the alternator independently from the excitation switch 7, which has a greater advantage for example in the case of a defective excitation switch 7, in a short circuit, with a maximum excitation current in the excitation coil of the alternator. This embodiment is suitable for production of the protection device 11' on a separate substrate, distinct from that on which the remainder of the regulator is implanted, which reinforces its protection function by making possible improved resistance to any overheating of the regulator, as a result for example of thermal destruction of the excitation switch 7. The dedicated electrical supply 28 also reinforces this separation between the protection device 11' and the remainder of the regulator.

An alternator comprising the control system 17 according to the invention thus benefits from a definite competitive advantage in comparison with the prior models, since for a comparable cost the protection against excess voltages is made absolute.

It will be appreciated that the invention is not limited simply to the above-described preferred embodiments.

The types of the electronic components cited are thus simply examples of implementation. They can be replaced alternatively as much as required by other components which perform the same functions or the same groups of functions.

The invention thus incorporates all the possible variant embodiments which would remain within the context defined by the following claims.

The invention claimed is:

1. A system (17) for controlling a supply voltage (B+A) of an on-board electrical network of a motor vehicle, said system (17) comprising:
    a digital regulation device (2, 4, 9, 16) for regulation of said supply voltage (B+A); and
    a protection device (11) for protection against excess voltages of said on-board electrical network;
    said digital regulation device (2, 4, 9, 16) and said protection device (11) control jointly excitation of an alternator which supplies said on-board electrical network,
    wherein said protection device (11) is distinct from said digital regulation device (2, 4, 9, 16).

2. The system (17) according to claim 1, wherein an excess voltage signal (OVD) which is generated by said protection device (11) and controls said excitation takes priority over an excitation signal (EXC) which is generated by said regulation device (2, 4, 9, 16).

3. The system (17) according to claim 2, wherein said protection device (11) comprises:
    a first acquisition system (12) for acquisition of said supply voltage (B+A) and/or a battery voltage (B+) at the terminals of a battery which is connected to said on-board electrical network;
    a comparison system (13) for comparison of said supply voltage (B+A) and/or of said battery voltage (B+), respectively with a first reference voltage (Vref1) and/or a second reference voltage (Vref2);
    an integration system (14) for integration of an output signal (S1) of said comparison system (13);
    an interface system (15) which generates said excess voltage signal (OVD) from an integrated output signal (S2).

4. The system (17) according to claim 3, wherein said comparison system (13) has a hysteresis.

5. The system (17) according to claim 3, wherein said first acquisition system (12) for acquisition comprises a first capturing system (19) for capturing said supply voltage (B+A) and/or said battery voltage (B+), and a first filter (20).

6. A system (17) for controlling a supply voltage (B+A) of an on-board electrical network of a motor vehicle, said system (17) comprising:
    a digital regulation device (2, 4, 9, 16) for regulation of said supply voltage (B+A); and
    a protection device (11) for protecting against excess voltages of said on-board electrical network;
    said digital regulation device (2, 4, 9, 16) and said protection device (11) control jointly excitation of an alternator which supplies said on-board electrical network;
    said protection device (11) is distinct from said regulation device (2, 4, 9, 16);
    an excess voltage signal (OVD) generated by said protection device (11) and controlling said excitation takes priority over an excitation signal (EXC) which is generated by said regulation device (2, 4, 9, 16);
    said protection device (11) comprising
        a first acquisition system (12) for acquisition of said supply voltage (B+A) and/or a battery voltage (B+) at the terminals of a battery which is connected to said on-board electrical network;
        a comparison system (13) for comparison of said supply voltage (B+A) and/or of said battery voltage (B+), respectively with a first reference voltage (Vref1) and/or a second reference voltage (Vref2);
        an integration system (14) for integration of an output signal (S1) of said comparison system (13);
        an interface system (15) which generate said excess voltage signal (OVD) from an integrated output signal (S2);
    said integration system (14) comprising an offset register (25) controlled by a first clock (26).

7. The system (17) according to claim 2, further comprising a power circuit (16) comprising a semiconductor excitation switch (7) which can switch an excitation circuit (8) of said alternator and is controlled by a control signal (EXC_DR) generated by a validation system (18) for validation of said excitation signal (EXC) by said excess voltage signal (OVD).

8. The system (17) according to claim 6, wherein said regulation device (2, 4, 9, 16) comprises:
    a second acquisition system (2, 4) for acquisition of said battery voltage (B+); and
    a digital regulation loop (9) which generates said excitation signal (EXC) according to said battery voltage (B+).

9. The system (17) according to claim 8, wherein said second acquisition system (2, 4) comprises a second capturing system (2) for capturing said battery voltage (B+), including at least one bridge of resistors (34) and a second filter (4) including at least one capacitor (35).

10. The system (17) according to claim 9, wherein said digital regulation loop (9) comprises, controlled by a second clock (36), an analogue-digital converter (3) at the output of said second filter (4), and a processing unit (5), a wired logic circuit or the like, at the output of said analogue-digital converter (3).

11. The system (17) according to claim 1, wherein said regulation device (2, 4, 9, 16) and said protection device (11) are produced as two distinct electronic blocks on separate substrates.

12. The system (17) according to claim 1, wherein said protection device (11) comprises a semiconductor protection switch (7') which can open an excitation circuit (8) of said alternator at the command of said excess voltage signal (OVD), and a dedicated electrical supply (28).

13. An alternator of a motor vehicle, comprising a system (17) for controlling a supply voltage (B+A) of an on-board electrical network of a motor vehicle according to claim 1.

14. The system (17) according to claim 4, wherein said first acquisition system (12) comprises a first capturing system (19) for capturing said supply voltage (B+A) and/or said battery voltage (B+), and a first filter (20).

15. A system (17) for controlling a supply voltage (B+A) of an on-board electrical network of a motor vehicle, said system (17) comprising:
- a regulation device (2, 4, 9, 16) of a digital type for regulation of said supply voltage (B+A); and
- a protection device (11) for protection against excess voltages of said on-board electrical network;
- said digital regulation device (2, 4, 9, 16) and said protection device (11) control jointly excitation of an alternator which supplies said on-board electrical network;
- said protection device (11) is distinct from said regulation device (2, 4, 9, 16);
- an excess voltage signal (OVD) generated by said protection device (11) and controlling said excitation takes priority over an excitation signal (EXC) which is generated by said regulation device (2, 4, 9, 16);
- said protection device (11) comprising
  - a first acquisition system (12) for acquisition of said supply voltage (B+A) and/or a battery voltage (B+) at the terminals of a battery which is connected to said on-board electrical network;
  - a comparison system (13) for comparison of said supply voltage (B+A) and/or of said battery voltage (B+), respectively with a first reference voltage (Vref1) and/or a second reference voltage (Vref2), said comparison system (13) having a hysteresis;
  - an integration system (14) for integration of an output signal (S1) of said comparison system (13);
  - an interface system (15) which generate said excess voltage signal (OVD) from an integrated output signal (S2);
  - said integration system (14) comprising an offset register (25) controlled by a first clock (26).

16. The system (17) according to claim 3, further comprising a power circuit (16) comprising a semiconductor excitation switch (7) which can switch an excitation circuit (8) of said alternator and is controlled by a control signal (EXC_DR) generated by a validation system (18) for validation of said excitation signal (EXC) by said excess voltage signal (OVD).

17. The system (17) according to claim 4, wherein it additionally comprises a power circuit (16) comprising a semiconductor excitation switch (7) which can switch an excitation circuit (8) of said alternator and is controlled by a control signal (EXC_DR) generated by means (18) for validation of said excitation signal (EXC) by said excess voltage signal (OVD).

18. The system (17) according to claim 4, wherein said regulation device (2, 4, 9, 16) comprises:
- a second acquisition system (2, 4) for acquisition of said battery voltage (B+); and
- a digital regulation loop (9) which generates said excitation signal (EXC) according to said battery voltage (B+).

* * * * *